(12) United States Patent
Martinez et al.

(10) Patent No.: US 8,788,439 B2
(45) Date of Patent: Jul. 22, 2014

(54) INSTANCE WEIGHTED LEARNING MACHINE LEARNING MODEL

(71) Applicant: InsideSales.com, Inc., Provo, UT (US)

(72) Inventors: Tony Ramon Martinez, Orem, UT (US); Xinchuan Zeng, Orem, UT (US)

(73) Assignee: InsideSales.com, Inc., Provo, UT (US)

( * ) Notice: Subject to any disclaimer, the term of this patent is extended or adjusted under 35 U.S.C. 154(b) by 0 days.

(21) Appl. No.: 13/725,653

(22) Filed: Dec. 21, 2012

(65) Prior Publication Data

US 2014/0180975 A1     Jun. 26, 2014

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 6,353,814 B1* | 3/2002 | Weng | 706/12 |
| 6,581,048 B1* | 6/2003 | Werbos | 706/23 |
| 7,152,051 B1 | 12/2006 | Commons et al. | |
| 8,185,486 B2* | 5/2012 | Eder | 706/45 |
| 8,285,667 B2 | 10/2012 | Jaros et al. | |
| 8,352,389 B1 | 1/2013 | Martinez et al. | |
| 2003/0140023 A1 | 7/2003 | Ferguson et al. | |
| 2005/0265607 A1 | 12/2005 | Chang | |
| 2007/0005539 A1 | 1/2007 | Bergman et al. | |
| 2007/0174105 A1* | 7/2007 | Abe et al. | 705/10 |
| 2008/0249844 A1 | 10/2008 | Abe et al. | |
| 2008/0288292 A1* | 11/2008 | Bi et al. | 705/3 |
| 2009/0092312 A1* | 4/2009 | Kasahara et al. | 382/159 |
| 2009/0157571 A1 | 6/2009 | Smith et al. | |
| 2009/0176580 A1 | 7/2009 | Herrmann et al. | |
| 2010/0145678 A1 | 6/2010 | Csomai et al. | |
| 2010/0280827 A1 | 11/2010 | Mukerjee et al. | |
| 2011/0046970 A1* | 2/2011 | Fontenot | 705/2 |
| 2011/0099130 A1* | 4/2011 | Blumberg et al. | 706/12 |
| 2011/0106735 A1 | 5/2011 | Weston et al. | |
| 2011/0106743 A1 | 5/2011 | Duchon | |
| 2011/0119213 A1 | 5/2011 | Elisseeff et al. | |
| 2011/0153419 A1 | 6/2011 | Hall | |
| 2011/0213741 A1 | 9/2011 | Shama et al. | |
| 2011/0270779 A1 | 11/2011 | Showalter | |

(Continued)

OTHER PUBLICATIONS

U.S. Appl. No. 13/590,000, filed Aug. 20, 2012.

(Continued)

*Primary Examiner* — Kakali Chaki
*Assistant Examiner* — Michael Zidanic
(74) *Attorney, Agent, or Firm* — Maschoff Brennan

(57) ABSTRACT

An instance weighted learning (IWL) machine learning model. In one example embodiment, a method of employing an IWL machine learning model to train a classifier may include determining a quality value that should be associated with each machine learning training instance in a temporal sequence of reinforcement learning machine learning training instances, associating the corresponding determined quality value with each of the machine learning training instances, and training a classifier using each of the machine learning training instances. Each of the machine learning training instances includes a state-action pair and is weighted during the training based on its associated quality value using a weighting factor that weights different quality values differently such that the classifier learns more from a machine learning training instance with a higher quality value than from a machine learning training instance with a lower quality value.

8 Claims, 11 Drawing Sheets

(56) References Cited

U.S. PATENT DOCUMENTS

2011/0301447 A1* 12/2011 Park et al. .................... 600/407
2012/0041727 A1   2/2012 Mishra et al.
2012/0203720 A1   8/2012 Baker

OTHER PUBLICATIONS

U.S. Appl. No. 13/590,028, filed Aug. 20, 2012.
Friedman, et al., "An algorithm for finding nearest neighbors", IEEE Transactions on Computers, C-24, 10, 1000-1006 (1975).
Kaelbling, et al., "Reinforcement Learning: A Survey", Journal of Artificial Intelligence Research 4: 237-285 (1996).
Quinlan, J.R., "Improved use of continuous attributes in c4.5", Journal of Artificial Intelligence Research, 4:77-90 (1996).
Smith, et al., "Improving Classification Accuracy by Identifying and Removing Instances that Should Be Misclassified", Proceedings of IJCNN-2011 (International Joint Conference on Neural Networks), pp. 2690-2697 (2011).
Sutton, Richard S., "Learning to Predict by the Methods of Temporal Differences", Machine Learning (Springer) 3: 9-44 (1988).
Cover, et al., "Nearest Neighbor Pattern Classification", IEEE Transactions on Information Theory 13 (1): 21-27 (1967).
Quinlan, J. R (1986). Induction of Decision Trees. Machine Learning 1, Mar. 1, 1986, 81-106.
Leclercq et al. "Autonomous learning algorithm or fully connected recurrent networks", ESANN, 2003, pp. 379-384.
Bilmes et al., "Generalized ruled for combination and joint training of classifiers", PAA 2003, pp. 201-211.
U.S. Appl. No. 13/590,028, Nov. 9, 2012, Notice of Allowance.
U.S. Appl. No. 13/590,028, Dec. 13, 2012, Notice of Allowance.
U.S. Appl. No. 13/590,000, Nov. 23, 2012, Office Action.
U.S. Appl. No. 13/590,000, May 22, 2013, Office Action.
International Search Report and Written Opinion mailed Feb. 28, 2014 in related PCT Application No. PCT/US13/55856.
International Search Report and Written Opinion dated Mar. 6, 2014 in related PCT Application No. PCT/US2013/055859.
International Search Report and Written Opinion dated Apr. 14, 2014 in related PCT Application No. PCT/US2013/077260.

* cited by examiner

Lead Source: Trade Show
Lead Title: Marketing Director
Lead Industry: Software
Lead State: Utah
Lead Created Date: 5/9/2010 10:15:21
Lead Company Size: 100
Lead Status: New
Number Of Previous Dials: 2
Number Of Previous Emails: 1
Previous Action: Email
Hours Since Last Action: 51.216

FIG. 9

INSTANCE WEIGHTED LEARNING MACHINE LEARNING MODEL

FIELD

The embodiments discussed herein are related to an instance weighted learning (IWL) machine learning model.

BACKGROUND

Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

One example of machine learning is supervised learning (SL). The goal of SL is to learn an accurate mapping function g: X→Y from a set of labeled training instances T={$(x_1, y_1)$, $(x_2, y_2)$, ..., $(x_n, y_n)$}; where $x_i \in X$ are samples from an input space X and $y_i \in Y$ are labels from an output space Y ($i \in \{1, 2, ..., n\}$). The mapping function g is an element of possible mapping functions in the hypothesis space G. In conventional SL, all training instances are treated as equally relevant based on the assumption that all training instances should have the same impact on the mapping function g.

However, in real-world applications, not all training instances have the same relevance, and there can be variations in the relevance of both input $x_i$ and label $y_i$ in a training instance $(x_i, y_i)$. For example, when using SL on weather forecasting, training data may consist of historical samples of weather data such as measurements on temperature, wind, humidity, etc. However, such measurements may have variations including variations according to time of day, location, equipment employed, etc. For example, if training data is collected from different sources, the training instance from one source (e.g., a source with superior measurement methods, superior equipment, etc.) may have a higher relevance than training instances from another source (e.g., a source with inferior measurement methods, inferior equipment, etc.). In this example, conventional SL will consider training instances from different sources as equally relevant. As a result, higher-relevance training instances and lower-relevance training instances will have the same impact during the SL and thus the SL may not be able to generate an accurate mapping function g from the training data.

In another example, a training set may contain some training instances that have unknown input values. If a training instance has a large number of unknown input values, it may be less reliable (for example, it may have a higher likelihood of being mislabeled) and thus have a lower relevance than a training instance with known input values. If a training set contains a significant number of training instances with unknown input values, a conventional SL algorithm may not be able to learn an accurate mapping function g because of potential negative effects of low-relevance instances.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to methods of employing an instance weighted learning (IWL) machine learning model to train a classifier. The example methods disclosed herein may associate a quality value with each training instance in a set of reinforcement learning training instances to reflect differences in quality between different training instances. Then, during the training of a classifier using the set of training instances, each quality value may be employed to weight the corresponding training instance such that the classifier learns more from a training instance with a higher quality value than from a training instance with a lower quality value.

In one example embodiment, a method for employing an IWL machine learning model may include associating a quality value with each machine learning training instance in a set of reinforcement learning machine learning training instances.

In another example embodiment, a method of employing an IWL machine learning model to train a classifier may include training a classifier using a set of reinforcement learning machine learning training instances. Each of the machine learning training instances is weighted during the training based on a quality value that has been associated with the machine learning training instance such that the classifier learns more from a machine learning training instance with a higher quality value than from a machine learning training instance with a lower quality value.

In yet another example embodiment, a method of employing an IWL machine learning model to train a classifier may include determining a quality value that should be associated with each machine learning training instance in a temporal sequence of reinforcement learning machine learning training instances, associating the corresponding determined quality value with each of the machine learning training instances, and training a classifier using each of the machine learning training instances. Each of the machine learning training instances includes a state-action pair and is weighted during the training based on its associated quality value using a weighting factor that weights different quality values differently such that the classifier learns more from a machine learning training instance with a higher quality value than from a machine learning training instance with a lower quality value.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9 illustrates an example computer screen image of a user interface of an example LRM system;

DESCRIPTION OF EMBODIMENTS

Figure 1:
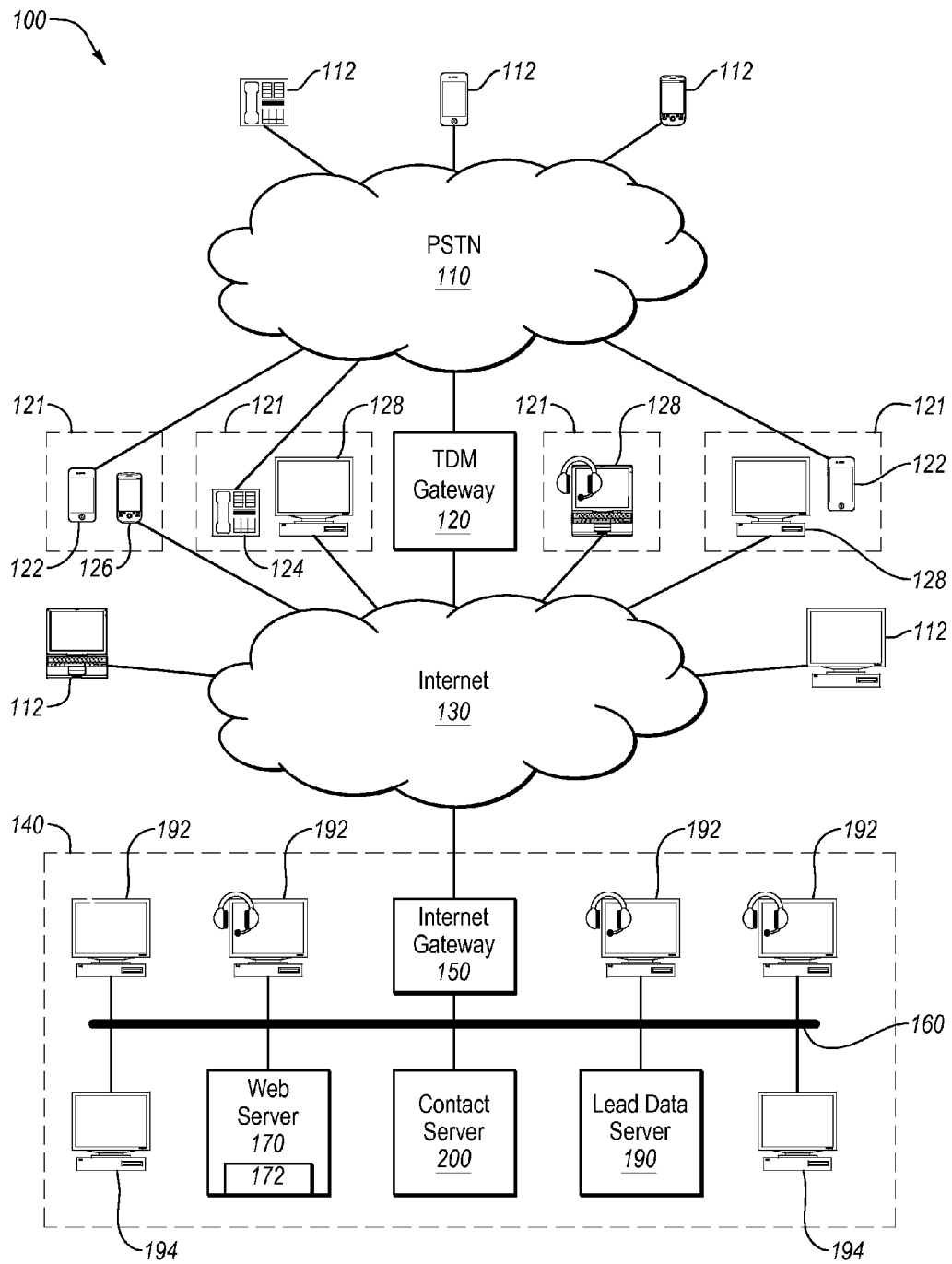
FIG. 1 is a schematic block diagram illustrating an example lead response management (LRM) system including an example contact server.

Some embodiments described herein include methods of employing an instance weighted learning (IWL) machine learning model to train a classifier. The example methods disclosed herein may associate a quality value with each training instance in a set of reinforcement learning training instances to reflect differences in quality between different training instances. Then, during the training of a classifier using the set of training instances, each quality value may be employed to weight the corresponding training instance such that the classifier learns more from a training instance with a higher quality value than from a training instance with a lower quality value.

As used herein, the term "multiple output dependency" or "MOD" refers to an output decision, or a problem having an output decision, that includes multiple output components which are interdependent in that each component is dependent not only on an input but also on the other components. Some example MOD problems include, but are not limited to: 1) which combination of stocks to purchase to balance a mutual fund given current stock market conditions, 2) which combination of players to substitute into a lineup of a sports team given the current lineup of the opposing team, and 3) which combination of shirt, pants, belt, and shoes to wear given the current weather conditions. In each of these examples, each component of the output decision depends on both the input (current stock market conditions, an opposing team lineup, or current weather conditions) and the other components (the other stocks purchased, the other substituted player, or the other clothing selected). Other examples of MOD problems may relate to hostage negotiations, retail sales, online shopping carts, web content management systems, customer service, contract negotiations, or crisis management, or any other situation that requires an output decision with multiple interdependent output components.

Another example MOD problem is lead response management (LRM). LRM is the process of responding to leads in a manner that optimizes contact or qualification rates. Leads may come from a variety of sources including, but not limited to, a web form, a referral, and a list purchased from a lead vendor. When a lead comes into an organization, the output decision of how to respond to the lead may include multiple interdependent components such as, but not limited to, who should respond to the lead, what method should be employed to respond to the lead, what content should be included in the response message, and when should the response take place. Each of these components of the output decision depends on both the input (the lead information) and the other components. For example, the timing of the response may depend on the availability of the person selected to respond. Also, the content of the message may depend on the method of response (e.g. since the length of an email message is not limited like the length of a text message). Although the example methods disclosed herein are generally explained in the context of LRM, it is understood that the example methods disclosed herein may be employed to solve any single output problem, multiple output problem, or MOD problem.

Example embodiments will be explained with reference to the accompanying drawings.

FIG. 1 is a schematic block diagram illustrating an example LRM system 100. As depicted, the example LRM system 100 includes various components such as a public switched telephone network (PSTN) 110, user communication and/or computing devices 112, a TDM gateway 120 connecting the PSTN 100 to an internet 130, remote agent stations 121, workstations 128, a call center 140, an internet gateway 150 connecting a local area network 160 to the internet 130, a web server 170, a contact server 200, a lead data server 190, local agent workstations 192, and control workstations 194. The various components of the example LRM system 100 operably interconnected to collaboratively improve a process of responding to leads in a manner that optimizes contact or qualification rates.

As disclosed in FIG. 1, the remote agent stations 121 include wireless phones 122, wired phones 124, wireless computing devices 126, and workstations 128. In certain embodiments, the wireless phones 122 or the wired phones 124 may be voice over internet protocol (VOIP) phones. In some embodiments, the computing devices 126 or the workstations 128 may be equipped with a soft phone. The remote agent stations 121 enable agents to respond to lead from remote locations similar to agents stationed at the workstations 192 and directly connected to the local area network 160.

In one example embodiment, the local area network 160 resides within a call center 140 that uses VoIP and other messaging services to contact users connected to the PSTN 110 and/or the internet 130. The various servers in the call center 140 function cooperatively to acquire leads, store lead information, analyze lead information to decide how best to respond to each lead, distribute leads to agents via agent terminals such as the local agent workstations 192 and the remote agent stations 121 for example, facilitate communication between agents and leads via the PSTN 110 or the internet 130 for example, track attempted and successful agent interaction with leads, and store updated lead information.

The web server 170 may provide one or more web forms 172 to users via browser displayable web pages. The web forms may be displayed to the users via a variety of communication and/or computing devices 112 including phones, smart phones, tablet computers, laptop computers, desktop computers, media players, and the like that are equipped with a browser. The web forms 172 may prompt the user for contact data such as name, title, industry, company information, address, phone number, fax number, email address, instant messaging address, referral information, availability information, and interest information. The web server 170 may receive the lead information associated with the user in response to the user submitting the web form and provide the lead information to contact server 200 and the lead data server 190, for example.

The contact server 200 and the lead data server 190 may receive the lead information and retrieve additional data associated with the associated user such as web analytics data, reverse lookup data, credit check data, web site data, web site rank information, do-not-call registry data, data from a customer relationship management (CRM) database, and background check information. The lead data server 190 may store the collected data in a lead profile (not shown) and associate the user with an LRM plan (not shown).

The contact server 200 may contact a lead in accordance with an associated LRM plan and deliver lead information to an agent to enable the agent to respond to the lead in a manner that optimizes contact or qualification rates. The particular purpose of such contact or qualification may include, for example, establishing a relationship with the lead, thanking the lead for their interest in a product, answering questions from the lead, informing the lead of a product or service offering, selling a product or service, surveying the lead on their needs and preferences, and providing support to the lead. The contact server 200 may deliver the information to the agent using a variety of delivery services such as email services, instant messaging services, short message services, enhanced messaging services, text messaging services, telephony-based text-to-speech services, and multimedia delivery services. The agent terminals 121 or 192 may present the lead information to the agent and enable the agent to respond to the lead by communicating with the lead.

Figure 2:
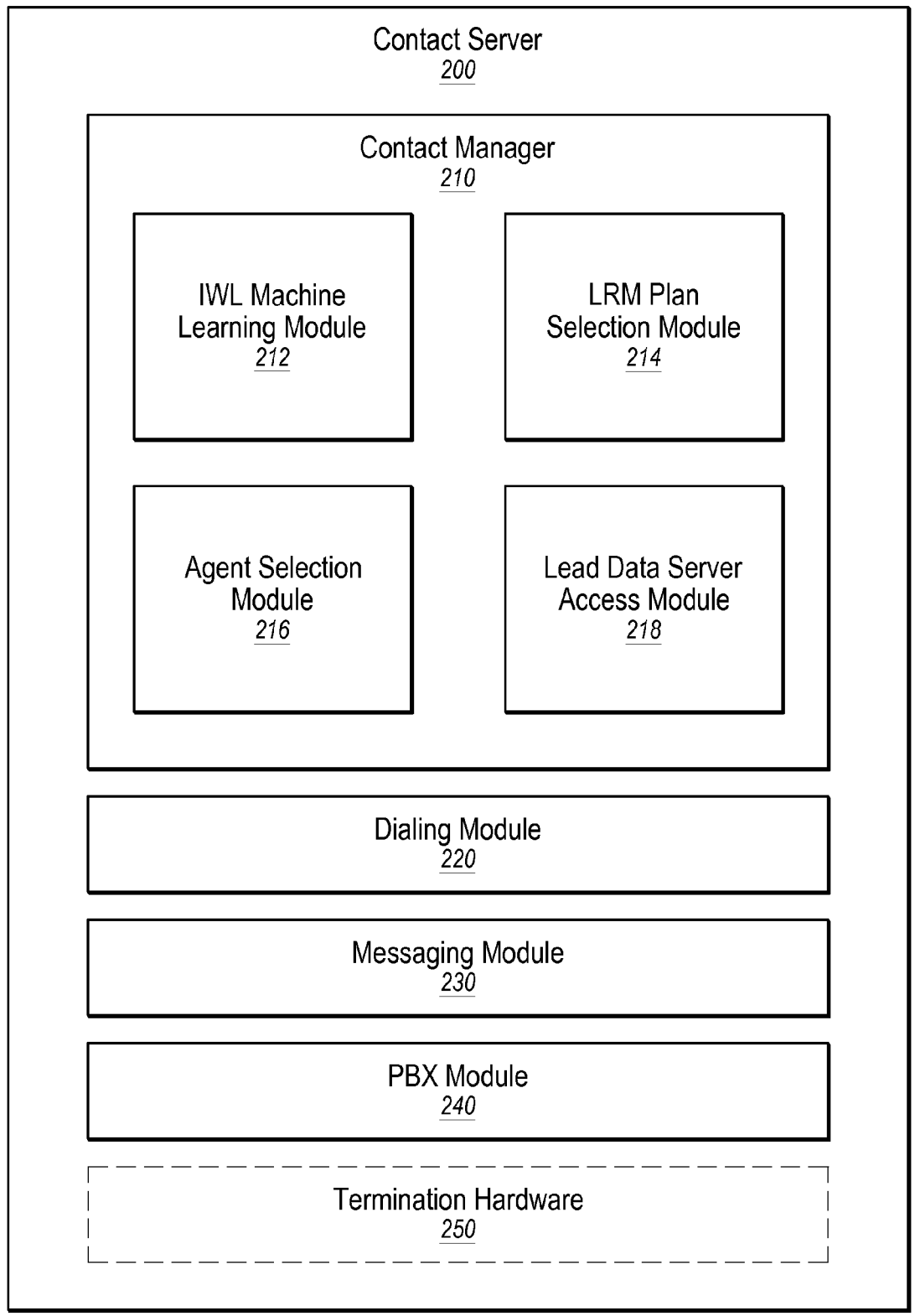
FIG. 2 is a schematic block diagram illustrating additional details of the example contact server of FIG. 1.

FIG. 2 is a schematic block diagram illustrating additional details of the example contact server 200 of FIG. 1. As disclosed in FIG. 2, the contact server 200 includes a contact manager 210, a dialing module 220, a messaging module 230, a PBX module 240 and termination hardware 250. In the depicted embodiment, the contact manager includes an IWL machine learning module 212, an LRM plan selection module 214, an agent selection module 216, and a lead data server access module 218. Although shown within the contact server 200, the depicted modules may reside partially or wholly on other servers such as the web server 170 and the lead data server 190 for example. The contact server 200 enables an agent to communicate with a lead in conjunction with an LRM plan.

The contact manager 210 establishes contact with users and agents and manages contact sessions where needed. The contact manager 210 may initiate contact via the dialing module 220 and/or the messaging module 230.

The IWL machine learning module 212 employs an IWL machine learning model to train classifiers and then employs the trained classifiers to predict multiple interdependent output components of an MOD output decision, according to the example methods disclosed herein. In at least some example embodiments, the IWL machine learning module 212 utilizes the lead data server access module 208 to access and analyze lead information stored on the lead data server 190 of FIG. 1. Once one or more response decisions are predicted for a particular lead, the one or more response decisions may be conveyed to the LRM plan selection module 214.

The LRM plan selection module 214 presents and or selects one or more LRM plans for a particular lead and/or offering. Similarly, the agent selection module 216 selects an agent, class of agent, or agent skill set that is designated in each LRM plan.

The lead data server access module 218 enables the contact manager 210 to access lead information that is useful for contacting a lead. In one embodiment, the data storage access module 218 enables the contact manager 210 to access the lead data server 190.

The dialing module 220 establishes telephone calls including VoIP telephone calls and PSTN calls. In one embodiment, the dialing module 220 receives a unique call identifier, establishes a telephone call, and notifies the contact manager 210 that the call has been established. Various embodiments of the dialing module 220 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 directs the PBX module 240 to perform the auxiliary functions.

The messaging module 230 sends and receives messages to agents and leads. To send and receive messages, the messaging module 230 may leverage one or more delivery or messaging services such as email services, instant messaging services, short message services, text message services, and enhanced messaging services.

The PBX module 240 connects a private phone network to the PSTN 110. The contact manager 210 or dialing module 220 may direct the PBX module 240 to connect a line on the private phone network with a number on the PSTN 110 or internet 130. In some embodiments, the PBX module 240 provides some of the auxiliary functions invoked by the dialing module 220.

The termination hardware 250 routes calls from a local network to the PSTN 110. In one embodiment, the termination hardware 250 interfaces to conventional phone terminals. In some embodiments and instances, the termination hardware 250 provides some of the auxiliary functions invoked by the dialing module 220.

Having described a specific environment (an LRM system) and specific application (LRM) with respect to FIGS. 1 and 2, it is understood that this specific environment and application is only one of countless environments and application in which example embodiments may be employed. The scope of the example embodiments are not intended to be limited to any particular environment or application.

At least some example embodiments disclosed herein employ an IWL machine learning model to address the issue of different training instances having different relevancies by assigning a quality value to each training instances to reflect differences in quality among training instances. In conventional supervised learning, each training instance is weighted the same, and thus the effects of the quality of each training instance are not taken into account. Instead, conventional supervised learning trains a classifier to learn equally from each training instance in a set of training instances regardless of whether a particular training instance has a low quality or a high quality. In contrast, IWL employs an instance weighted training method that reflects the effect of a quality value q for each training instance by weighting each training instance based on its quality value q. Thus, IWL is superior to conventional supervised learning because IWL enables a classifier to learn more from a high-quality training instance than a low-quality training instance.

In a class of most common reinforcement learning algorithms, a function $Q(s, a)$ is used to represent expected maximum reward when taking action a at state s. A policy can be derived from $Q(s, a)$ as follows: given a state s, the best action a to take is the one among all allowed actions that maximizes $Q(s, a)$. A main goal of training for this type of reinforcement learning algorithm is to learn an accurate $Q(s, a)$ from training data. The following discussion will be mainly focused on the Q-learning-based reinforcement learning algorithm (QLB-RL), which has been successfully applied in many real-world applications.

QLB-RL uses a Q-learning algorithm to learn $Q(s, a)$ through exploration and exploitation in input state space. It usually needs to experience a very large number of actions in order to accurately learn $Q(s, a)$ and find the best policy. For a small state space, reinforcement learning may use a table to represent Q(s, a) for all possible (s, a) pairs. For a very large state space (e.g, continuous state space), it may use a functional mapping to approximate Q(s, a).

If an application has a very large input state space (such as LRM), it may be very difficult for QLB-RL to obtain accurate generalization with a functional mapping. One reason for this difficulty is that it may be difficult to accurately approximate Q(s, a) when an input state space becomes very large. For QLB-RL, this problem becomes even more severe for applications in which only recorded training instances can be applied for training (such as LRM). In those applications, QLB-RL cannot use an exploration strategy to explore a large input state space. For example, when reinforcement learning is applied to learn how to play chess, it can explore any types of moves as allowed by the chess rules, and then observe rewards of actions. But for LRM, it may be infeasible to try various new types of actions (such as different response agent titles, response methods, response message types, and response timings, as discussed in greater detail below) in real-world settings since doing so may be very costly and also very slow. Also, effects of new actions are usually unknown initially and it may take a long period of time before knowing their effects on subsequent state-action pairs in a sequence. Without knowledge of their effects, new actions cannot be applied as training data. Thus it is even more difficult for QLB-RL to achieve an accuracy approximation for Q(s, a) for those types of applications.

In contrast, IWL can use standard machine learning algorithms, such as back-propagation learning for MLP, to learn a best policy directly from state-action pairs and their q values without the need for function approximation. IWL can use instance weighted training methods and allow q values to be reflected directly in learning algorithms, such as via learning rate for MLP training. Thus, IWL can provide a more efficient and more accurate learning model for these types of applications.

An IWL set of training instances may be represented in the format: $T=\{(x_1, y_1, q_1), (x_2, y_2, q_2), \ldots, (x_n, y_n, q_n)\}$; where $x_i \in X$ are samples from an input space X; $y_i \in Y$ are labels from an output space Y; and $q_i \in R$ is the quality value associated with the training instance $(x_i, y_i)$ ($i \in \{1, 2, \ldots, n\}$). The value of $q_i$ may be a real-value that is proportional to the quality of $(x_i, y_i)$ and may be in the range of [−1.0, 1.0]. For example in some applications, a quality value $q_i$ may be assigned a value of 1.0 for a high-quality training instance and −1.0 for a low-quality training instance. In other applications, a quality value $q_i$ may be in the range of [0.0, 1.0], reflecting the relative quality of a training instance. In yet other applications, a quality value $q_i$ may be beyond the range of [−1.0, 1.0]. For example, in temporal policy learning a quality value $q_i$ of a training instance may be derived from accumulated discounted rewards from previous actions, as discussed herein in connection with FIG. 3.

In the example LRM implementation of FIGS. 3-4 and 6-10B, an IWL machine learning model is employed to train example multilayer perceptron (MLP) neural network classifiers MLP1, MLP2, MLP3, and MLP4. These MLP neural network classifiers may then be employed to predict multiple interdependent output components, namely $z_1$, $z_2$, $z_3$, and $z_4$, respectively, of an MOD output decision z based on the input feature vector x of FIG. 3B and based on all of the other predicted components. The MOD output decision z may be employed to decide for a given lead what response should be performed next in a sequence that will optimize the contact or qualification of the lead.

In the example LRM implementation of FIGS. 3-4 and 6-10B, $z_1$=response agent title, $z_2$=response method, $z_3$=response message type, and $z_4$=response timing. The classifier MLP1 is trained from (x, $z_2$, $z_3$, $z_4$; $z_1$) to predict response agent title $z_1$ using x, $z_2$, $z_3$, and $z_4$ as input; the classifier MLP2 is trained from (x, $z_1$, $z_3$, $z_4$; $z_2$) to predict response method $z_2$ using x, $z_1$, $z_3$, and $z_4$ as input; the classifier MLP3 is trained from (x, $z_1$, $z_2$, $z_4$; $z_3$) to predict response message type $z_3$ using x, $z_1$, $z_2$, and $z_4$ as input; and the classifier MLP4 is trained from (x, $z_1$, $z_2$, $z_3$; $z_4$) to predict response timing $z_4$ using x, $z_1$, $z_2$, and $z_3$ as input. Each of the components $z_1$, $z_2$, $z_3$, and $z_4$ has three (3) possible values as follows: $z_1 \in \{z_{11}, z_{12}, z_{13}\}$={sales vice president, sales manager, sales representative}; $z_2 \in \{z_{21}, z_{22}, z_{23}\}$={call, email, fax}; $z_3 \in \{z_{31}, z_{32}, z_{33}\}$={MT1, MT2, MT3}; and $z_4 \in \{z_{41}, z_{42}, z_{43}\}$={short, medium, long}.

It is understood that there is a dependency among components $z_1$, $z_2$, $z_3$, and $z_4$. For example, a decision on the component $z_2$ (response method) may have an influence on the decision for the component $z_4$ (response timing). For example, if $z_2$=dial, an agent may need to consider when a lead is available to talk on a phone (e.g. usually during business hours of the time zone where the lead resides). If $z_2$=email, the agent may send the email at any time.

It is further understood that the components of response agent title, response method, response message type, and response timing are only example components of an LRM MOD output decision. Other example components may include, but are not limited to, agent or lead demographic profile, agent or lead histographic profile (i.e. a profile of events in the life of the agent or the lead which could include past interactions between the agent and the lead), lead contact title (i.e. the title of a particular contact person within a lead organization), agent or lead psychographic profile (i.e. a profile of the psychological characteristics of the agent or the lead), agent or lead social network profile (i.e. the proximity of the agent to the lead in an online social network such as LinkedIn® or FaceBook® or in an offline social network such as the Entrepreneurs Organization®, civic clubs, fraternities, or religions), agent or lead geographic profile (i.e. cities, states, or other geographic designations that define current and/or past locations of the agent or the lead), response frequency (i.e. how often an agent contacts a lead), and response persistence (i.e. how long an agent persists in contacting a lead).

Although the base classifiers disclosed in the example LRM implementation of FIGS. 3-4 and 6-10B are MLP neural network classifiers, it is understood that IWL may alternatively employ other types of machine learning base classifiers including, but not limited to, other multilayer neural networks, decision trees, nearest neighbor classifiers, and support vector machines. Further, although the MLP classifiers are trained to learn an accurate policy for taking optimal actions in temporal sequences, and LRM is used as one example application to demonstrate IWL in more detail, it is understood that IWL may be applied to standard machine learning algorithms other than MLP algorithms, types of training data other than temporal sequences, and application domains other than LRM.

Figure 3:
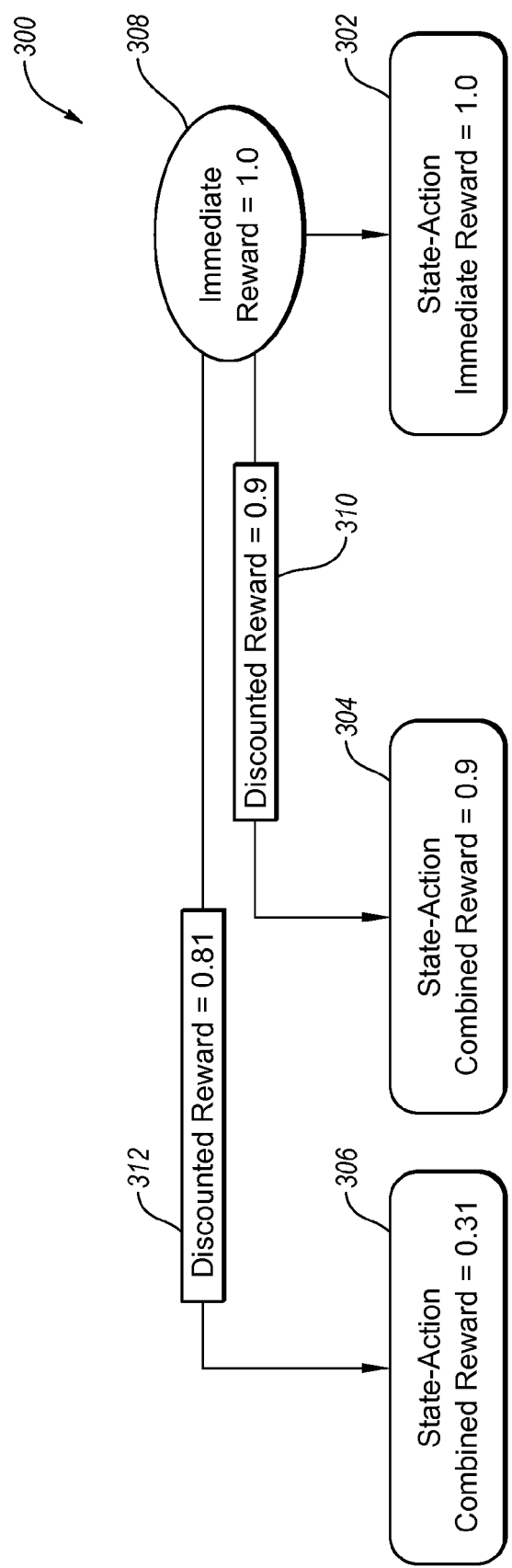
FIG. 3 is a schematic flowchart diagram illustrating an example method of deriving qualities of training instances by propagating a discounted reward.

FIG. 3 is a schematic flowchart diagram illustrating an example method 300 of deriving qualities of training instances by propagating a discounted reward. As disclosed in FIG. 3, the effect of an action in a temporal sequence on the whole sequence may not be fully reflected by its immediate reward. The action may also have effects on results of subsequent actions in the sequence. For example, when a deal is closed by an agent in the last action in a sequence, some of the previous actions in the sequence may also have contributed to this positive outcome. Thus, for each action, it may be reasonable to propagate some of its immediate reward back to previous actions in the sequence.

In particular, for each state-action training instance $(s_t, a_t)$, there is a reward value $r_t$, which is the immediate reward of the action $a_t$ and is dependent on the result of the action $a_t$. The reward value $r_t$ may be a real value in the range $[-1.0, 1.0]$. If $r_t > 0$ for a state-action pair $(s_t, a_t)$ at step t, it means that the action $a_t$ is a desirable action at state $s_t$ and a machine learning classifier should learn to emulate this action. If $q_t < 0$ for a state-action pair $(s_t, a_t)$ at step t, it means that the action $a_t$ is an undesirable action at state $a_t$ and a machine learning classifier should learn to avoid this action. For example, a positive reward $r_t$ may be assigned when a lead is qualified or a deal is closed with a lead and a negative reward $r_t$ may be assigned when a lead requests to be put on a "do not contact" list. A zero reward may be assigned when there is neither a positive nor a negative result.

In order to propagate some of the immediate reward $r_t$ of an action $a_t$ back to previous actions in the sequence, for each immediate reward $r_t$ of a state-action pair $(s_t, a_t)$ at time step t, all previous state-action pairs $(s_t, a_t)$, $(s_{t-1}, a_{t-1})$, ..., $(s_1, a_1)$ may receive a discounted reward from $r_t$. Where d is a discounted rate (0<d<1), the discounted rewards $r_t \cdot d$, $r_t \cdot d^2$, ..., $r_t \cdot d^{t-1}$ may be assigned to previous state-action pairs $(s_{t-1}, a_{t-1})$, $(s_{t-2}, a_{t-2})$, ..., $(s_1, a_1)$ to back propagate rewards. It is noted that this assignment results in the discounted reward being reduced the farther that each of the previous state-action pairs is positioned in the temporal sequence from the current state-action pair. Thus, each state-action pair $(s_t, a_t)$ will be assigned a combined reward which is the sum of its immediate reward and all discounted rewards back-propagated from subsequent actions. In IWL, this combined reward may be defined as, or may be a contribution to, a quality value q of each state-action pair.

For example, each state-action training instance with reward $(s_t, a_t, q_t)$ can be reformulated to $(s_t, a_t, q_t)$ where $q_t$ is the quality value at step t after propagation of all rewards. In other words, a sequence $L=\{(s_1, a_1, r_1), (s_2, a_2, r_2), ..., (s_n, a_n, r_n)\}$ may be reformulated as $L=\{(s_1, a_1, r_1), (s_2, a_2, r_2), ..., (s_n, a_n, r_n)\}$. For each sequence $L=\{(s_1, a_1, r_1), (s_2, a_2, r_2), ..., (s_n, a_n, r_n)\}$ with n state-action pairs, n training instances can be derived from this sequence and be added to a training set. Then, for training data with m temporal sequences $T=\{L_1, L_2, ..., L_m\}$, training instances can be derived from each sequence added to the training set. Thus, the total number of training instances that can be added to the training set is $N(L_1)+N(L_2)+...+N(L_m)$ where $N(L_i)$ is the length, or number of state-action training instances, of $L_i$ (i=1, 2, ..., m). After a training set is built from the temporal sequences $T=\{L_1, L_2, ..., L_m\}$, a classifier can be trained to learn a policy for decision making. The purpose of training is to enable a machine learning classifier to learn an optimal policy for making a decision (choosing action vector a) given an input feature vector (state vector s). For temporal sequences, IWL enables a classifier to learn more heavily from a high-quality training instance (which action has a high likelihood to generate a positive result) than a low-quality training instance. For example, where a training instance has a negative quality value q, IWL may assign a negative weighting to the training instance and thus enable a classifier to learn to avoid the action taken by the training instance. Thus, positive quality values tend to encourage learning to support instances similar to the training instance and negative quality values tend to discourage learning to support instances similar to the training instance.

In the example implementation of FIG. 3, each of the state-action pairs 302-306 has an immediate reward. For example, the action $a_3$ of the state-action pair 302 receives an immediate reward $r_3$ 308 of 1.0, signifying that the action $a_3$ performed at step 3 resulted in a positive outcome, such as the closing of a deal with a lead. Also, the action $a_2$ of the state-action pair 304 received an immediate reward $r_2$ of 0.0, signifying that the action $a_2$ performed at step 2 resulted in neither a positive nor a negative outcome with the lead. Also, the action $a_1$ of the state-action pair 306 received an immediate reward $r_1$ of $-0.5$, signifying that the action $a_1$ performed at step 1 resulted in a negative outcome, such as a lead requesting a delay before the next contact by an agent of the sales force.

The immediate reward $r_3$ 308 can then be back propagated to the state-action pair 304, which occurred at step 2, and to the state-action pair 306, which occurred at step 1. Where the discount rate is 0.9, the immediate reward $r_3$ 308 of 1.0 of the state-action pair 302 can be back propagated by adding the discounted reward 310 (1.0·0.9=0.9) to the immediate reward $r_2$ 306 of the state-action pair 304 (0.0+0.9=0.9) and by adding the discounted reward 312 (1.0·0.9·0.9=0.81) to the immediate reward $r_1$ of the state-action pair 306 ($-0.5+0.81=0.31$). Thus, the reward of the state-action pair 306 is 1.0, the combined reward of the state-action pair 304 is 0.9, and the combined reward of the state-action pair 302 is 0.31. These values can be employed as a quality values q where the state-action pairs 302-306 are used as state-action training instances in the training of a classifier, as disclosed below in connection with FIG. 4.

Figure 4:
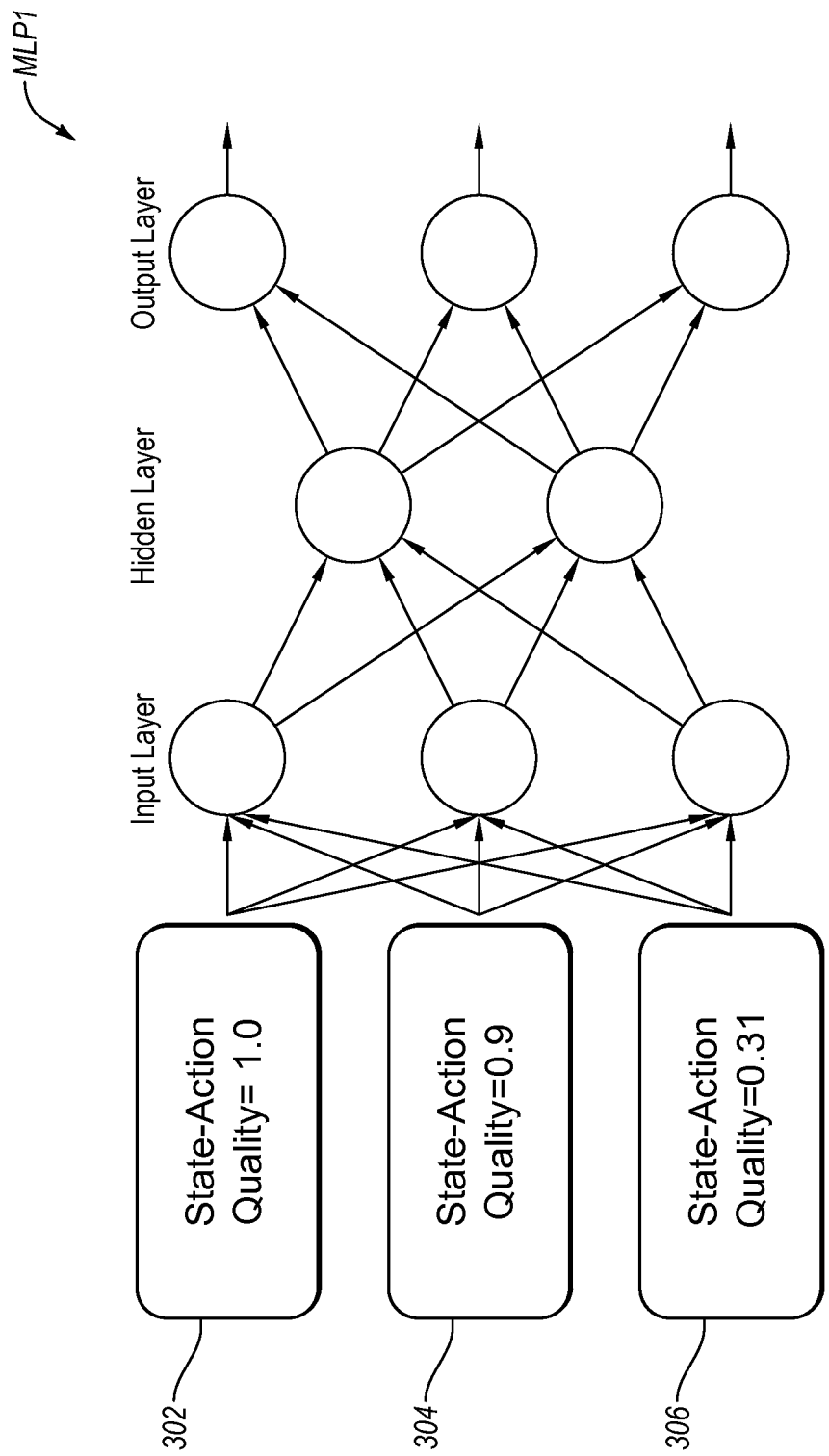
FIG. 4 is a schematic flowchart diagram illustrating an example instance weighted learning (IWL) machine learning model employed in the training of an example multilayer perceptron (MLP) neural network classifier.

FIG. 4 is a schematic flowchart diagram illustrating an example instance weighted learning (IWL) machine learning model employed in the training of an example multilayer perceptron (MLP) neural network classifier MLP1. As disclosed in FIG. 4, the classifier MLP1 is trained using a temporal sequence L of state-action training instances 302-306. The classifier MLP1 may be further trained using a set T of temporal sequences of state-action training instances, or training data T, which may be expressed as $T=\{L_1, L_2, ..., L_m\}$; where $L_m$ is the sequence of state-action training instances for sequence i (i=1, 2, ..., m). In the example implementation of FIG. 4, the training data T may include m temporal sequences from m unique leads. Each sequence may have a different number of state-action training instances.

In particular, each temporal sequence L consists of n state-action pairs, ordered by time step t. Each temporal sequence can be represented by $L=\{(s_1, a_1), (s_2, a_2), ..., (s_n, a_n)\}$; where $(s_t, a_t)$ represents a state-action training instance at step t (t=1, 2, ..., n). In the example LRM implementation of FIG. 4, each temporal sequence L may include a sequence of historical data recorded in a database. For example, for each unique lead in the lead data server 190 of FIG. 1, there may be a sequence of actions and results recorded for all interactions between a sales agent and the lead.

For a state-action training instance sequence $L=\{(s_1, a_1), (s_2, a_2), ..., (s_n, a_n)\}$; there is an associated sequence of rewards $R=\{r_1, r_2, ..., r_n\}$ where $r_t$ is the immediate reward for state-action training instance $(s_t, a_t)=1, 2, ..., n)$. State-action training instance sequence L may be represented in a combined form as follows $L=\{(s_1, a_1, r_1), (s_2, a_2, r_2), ..., (s_n, a_n, r_n)\}$; where $r_t$ is the immediate reward of state-action training instance $(s_t, a_t)$ at step t (t=1, 2, ..., n).

Each state $s_t$ may be represented by a feature vector: $s_t = (s_{t,1}, s_{t,2}, ... s_{t,u})$, which characterizes the state at step t. For example, a feature vector $s_t=(s_{t,1}, s_{t,2}, ... s_{t,u})$ may include the following components: lead source, lead title, lead industry, lead state, lead created date, lead company size, lead status, number of previous dials, number of previous emails, previous action, and hours since last action.

Each action $a_t$ at step t can be represented by an action vector $a_t=(a_{t,1}, a_{t,2}, \ldots a_{t,v})$; where $a_{t,j}$ (j=1, 2, ..., v) represents action component j of the action. Each action component $a_{t,j}$ can take an action from a set of allowed actions for $a_{t,j}$. In a typical scenario for a traditional reinforcement learning, an action vector usually includes only one component $a_t=(a_{t,1})$. For example, for playing chess, the only action component is to move the piece. The move can be chosen from a set of all allowed moves based on the rules of chess and the current state. However, in other applications, an action vector $a_t=(a_{t,1}, a_{t,2}, \ldots, a_{t,v})$ may include multiple action components (i.e. v>1). In some cases, multiple action components may be interdependent, such as applications having multiple output dependency (MOD).

For example, decision making for an LRM problem is a MOD problem, in which output decisions components (i.e. response agent title, response method, response message type, and response timing) are interdependent. In general, learning for a MOD problem is more challenging than learning for a problem with a single component or learning for a problem with multiple components that are independent (non-MOD). However, it is noted that IWL may be employed in solving each type of problem listed above, including single-component problems, non-MOD problems, and MOD problems.

In the LRM implementation of FIG. 4, the action vector $a_t=(a_{t,1}, a_{t,2}, \ldots, a_{t,v})$ may include the following action components: $a_{t,1}$: choosing agent title from {sales vice president, sales manager, sales representative}; $a_{t,2}$: choosing action method from {call, email, fax}; $a_{t,3}$: choosing message type from {MT1, MT2, MT3}; and $a_{t,4}$: choosing timing from {short, medium, long}. In FIG. 4, the classifier MLP1 will be trained to predict the action $a_{t,1}$, and similar classifiers MLP2, MLP3, and MLP4 will be trained to predict the actions $a_{t,2}$, $a_{t,3}$, and $a_{t,4}$, respectively, as disclosed in FIG. 7.

In conventional training of a multilayer perceptron (MLP) neural network classifier, such as back-propagation, weights of the training instances are updated in each iteration based on the formula: $\Delta w(i, j)=c \cdot \delta(j) \cdot z(i)$. In this formula, the amount of change $\Delta w(i, j)$ for weights $w(i, j)$ at node j is proportional to the error $\delta(j)$ at the node j as well as input value $z(i)$ from node i. The weights of the MLP neural network are also controlled by a learning rate c that controls the amount of change on the weights, which enables a smooth transition of weight update between iterations and keeps noisy training instances from having a significant effect. Thus, in conventional back-propagation training of an MLP, the above formula for updating weights is the same for all training instances, and thus all training instances are weighted the same.

In contrast, in the LRM implementation of FIG. 4, IWL may employ a quality value q weighting factor u(q) to weight training instances based on their quality values q. These embodiments of IWL modify the formula above as follows: $\Delta w(i, j)=u(q) \cdot c \cdot \delta(j) \cdot z(i)$. One example formula for the weighting factor u(q) is as follows: $u(q)=(a+b \cdot q)$; where a reflects the weight of using a conventional weight update and b reflects the weight of the q value on the weight update. Thus if a training instance has a larger q value, u(q) will be larger and a classifier will learn more positively from the training instance. The values of a and b may be set empirically by experimenting with different values and may vary depending on the particular application. One set of example parameters is as follows: a=0, b=1.0. Another set of example parameters is as follows: a=0.5, b=2.0. Using this modified formula, training instances with different q values will be weighted differently.

In the implementation of FIG. 4, and using parameter values a=0.5 and b=2.0, the state-action training instance 302 will have a weighting factor u(q) of (0.5+2.0·1.0=2.5), the state-action training instance 304 will have a weighting factor u(q) of (0.5+2.0·0.81=2.12), and the state-action training instance 306 will have a weighting factor u(q) of (0.5+2.0·0.31=1.12). Thus, since the state-action training instance 302 has a higher quality value q than the state-action training instance 306 (i.e., 1.0>0.31), the state-action training instance 302 will have a higher weighting factor u(q) than the state-action training instance 306 (i.e., 2.5>1.21). This difference in weighting factors u(q) between the state-action training instance 302 and the state-action training instance 306 will result in the classifier MLP1 of FIG. 4 learning more from the state-action training instance 302 than from the state-action training instance 306.

Figure 5:
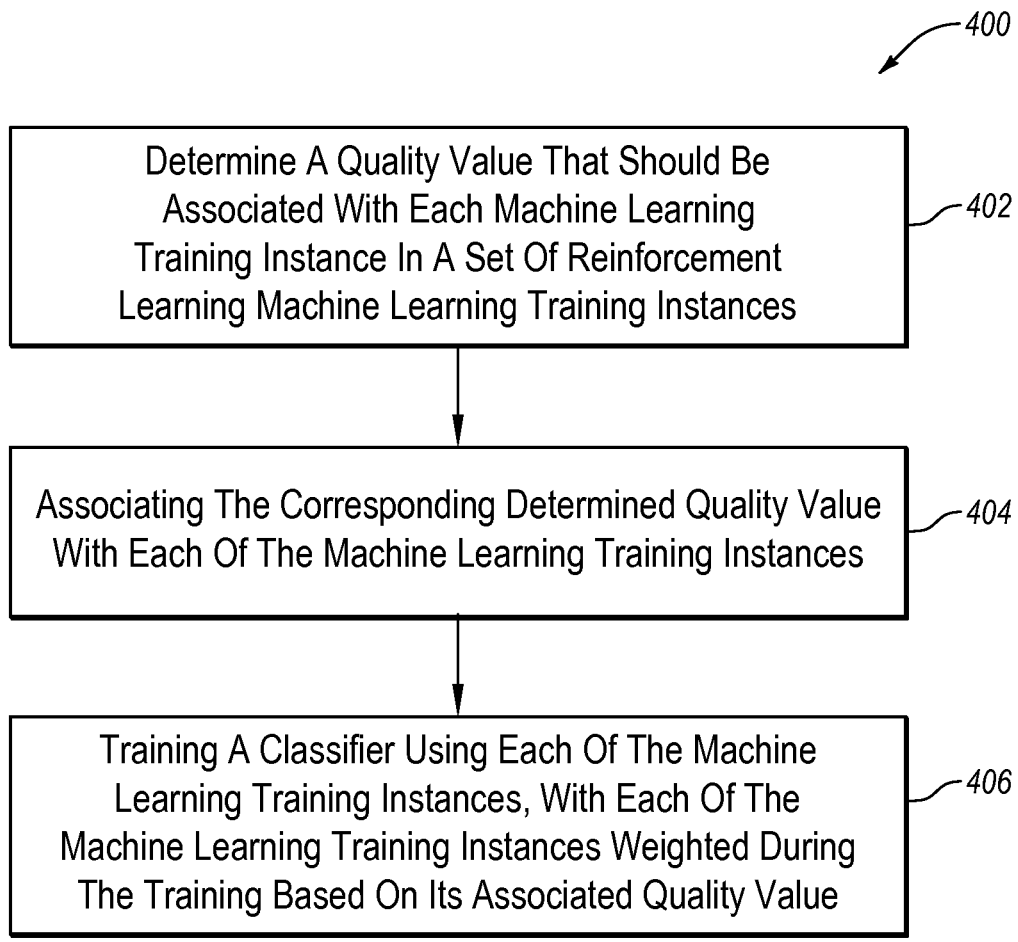
FIG. 5 is a schematic flowchart diagram of an example method of employing an IWL machine learning model to train a classifier.

FIG. 5 is a schematic flowchart diagram of an example method 400 of employing an IWL machine learning model to train a classifier. The method 400 may be implemented, in at least some embodiments, by the IWL machine learning module 212 of the contact manager 210 of the contact server 210 of FIG. 1. For example, the IWL machine learning module 212 may be configured to execute computer instructions to perform operations of employing an IWL machine learning model to train the classifier MLP1 of FIG. 4 to ultimately predict a first output components $z_1$ of multiple interdependent output components $z_1$, $z_2$, $z_3$, and $z_4$ of an LRM MOD output decision z, as represented by one or more of blocks 402, 404, and 406 of the method 400. Although illustrated as discrete blocks, various blocks may be divided into additional blocks, combined into fewer blocks, or eliminated, depending on the desired implementation. The method 400 will now be discussed with reference to FIGS. 1-5.

The method 400 may begin at block 402, in which a quality value that should be associated with each machine learning training instance in a set of reinforcement learning machine learning training instances is determined. For example, the IWL machine learning module 212 may determine a quality value q that should be associated with each machine learning training instance in the set of reinforcement learning state-action training instances 302-306. These quality values q may be determined in a number of ways, including using the method of deriving qualities of training instances by propagating a discounted reward of FIG. 3.

In particular, a reward of a current machine learning training instance in a temporal sequence may be determined and a discounted portion of the reward that should be associated with each of the previous machine learning training instances in the temporal sequence may also be determined. For example, the reward $r_t$ of the state-action training instance 302 may be determined to have a value of 1.0, and then a discounted portion of the reward $r_t$ that should be associated with the previous state-action training instance 304 and 306 may be determined, as disclosed in connection with FIG. 3.

In block 404, the corresponding determined quality value is associated with each of the machine learning training instances. For example, the IWL machine learning module 212 may associated the determined quality value q with each of the state-action training instances 302-306.

In block 406, a classifier is trained using each of the machine learning training instances, with each of the machine learning training instances weighted during the training based on its associated quality value. For example, the IWL machine learning module 212 may train the classifier MLP1 using each of the state-action training instances 302-306. During the training, the IWL machine learning module 212 may weight each of the machine learning training instances 302-306 based on its associated quality value q. This weighting during the training may be accomplished using a weighting factor, such as the weighting factor u(q) discussed herein, which weights different quality values differently. This weighting based on associated quality values q may result in the classifier MLP1 learning more from the machine learning training instance 302 with the higher quality value of 1.0 than from the machine learning training instance 306 with the lower quality value of 0.31.

It is noted that the method 400 may be employed where each of the training instances in the set of training instances is a MOD training instance, with each training instance including multiple interdependent output components. The method 400 may further be employed to train a separate classifier for each one of multiple interdependent output components. This training may be accomplished using the hierarchical based sequencing (HBS) machine learning model disclosed in related U.S. patent application Ser. No. 13/590,000, titled "HIERARCHICAL BASED SEQUENCING MACHINE LEARNING MODEL," which was filed on Aug. 20, 2012 and is expressly incorporated herein by reference in its entirety. Alternatively or additionally, this training may be accomplished using the multiple output relaxation (MOR) machine learning model disclosed in related U.S. patent application Ser. No. 13/590,028, titled "MULTIPLE OUTPUT RELAXATION MACHINE LEARNING MODEL," which was filed on Aug. 20, 2012 and is expressly incorporated herein by reference in its entirety.

Therefore, the method 400 may be used to employ an IWL machine learning model to train a classifier. The example method 400 herein may associate a quality value with each training instance in a set of training instances to reflect differences in quality between different training instances. Then, during the training of a classifier using the set of training instances, each quality value may be employed to weight the corresponding training instance such that the classifier learns more from a training instance with a higher quality value than from a training instance with a lower quality value.

In addition to being employed in the training of MLP neural networks, IWL may also be employed in connection with other machine learning classifiers. For example, IWL may be employed in the training of a nearest neighbor (NN) classifier. A k-nearest neighbor (k-NN) classifier makes a prediction based on voting from k nearest neighbors. Given an unseen instance s to be classified by a k-NN, k nearest neighbors are defined as k most closest instances to s in terms of distance in feature space. The optimal value for k value may vary depending on the particular application. For example, the optimal value for k may be k=1, k=3, or k=5.

IWL may be employed in the training of a k-NN by scaling the weight of voting of training instances based on q values of the training instances. For example, a training instance with a higher q value may be weighted more heavily, proportional to its q value, than a training instance with a lower q value. Thus a voted decision will carry more weight from high-q-value nearest neighbors than from low-q-value nearest neighbors, which may increase the probability of generating accurate k-NN classifiers.

In another example, IWL may be employed in the generation of a decision tree classifier. One of most common algorithms for generating a decision tree classifier in machine learning is the ID3 algorithm. During the generation of a decision tree using the ID3 algorithm, the decision on branching sub-trees at each tree node is based on information gain for each feature and their feature values. The calculation of information gain is based on counters of training instances for each feature and their feature values.

IWL may be employed in the generation of a decision tree using the ID3 algorithm by weighting the weight counter of each training instance based on its q value when calculating information gain. For a training instance with a higher q value, it may be counted more, proportional to its q value, than a training instance with a lower q value. Thus a decision tree generated using IWL will take into account more effects from high-q-value training instances than low-q-value training instances, which may increase the probability of generating accurate decision tree classifiers.

Figure 6:
FIG. 6 is a text diagram illustrating an example input feature vector.

FIG. 6 is a text diagram illustrating an example input feature vector x. The example input feature vector x of FIG. 6 includes information about a particular lead. In particular, the example input feature vector x includes constant features about a lead, such as lead title and lead industry, and interactive features related to interactions between an agent and the lead, such as previous number of dials and previous action. The lead information provided by the example input feature vector x may be employed as input by the model 300 of FIG. 3A in order to determine what is the next sequential response that should be performed that will optimize the contact or qualification of the lead.

It is understood that the input features of lead source, lead title, lead industry, lead state, lead created date, lead company size, lead status, number of previous dials, number of previous emails, previous action, and hours since last action are only example input features to an LRM MOD output decision. Other example input features may include, but are not limited to, response agent title, response method, response message type, response timing, agent or lead demographic profile, agent or lead histographic profile, agent or lead psychographic profile, agent or lead social network profile, agent or lead geographic profile, response frequency, and response persistence. Additionally, input features could include data on current events, such as current events related to politics, economics, natural phenomena, society, and culture.

Figure 7:
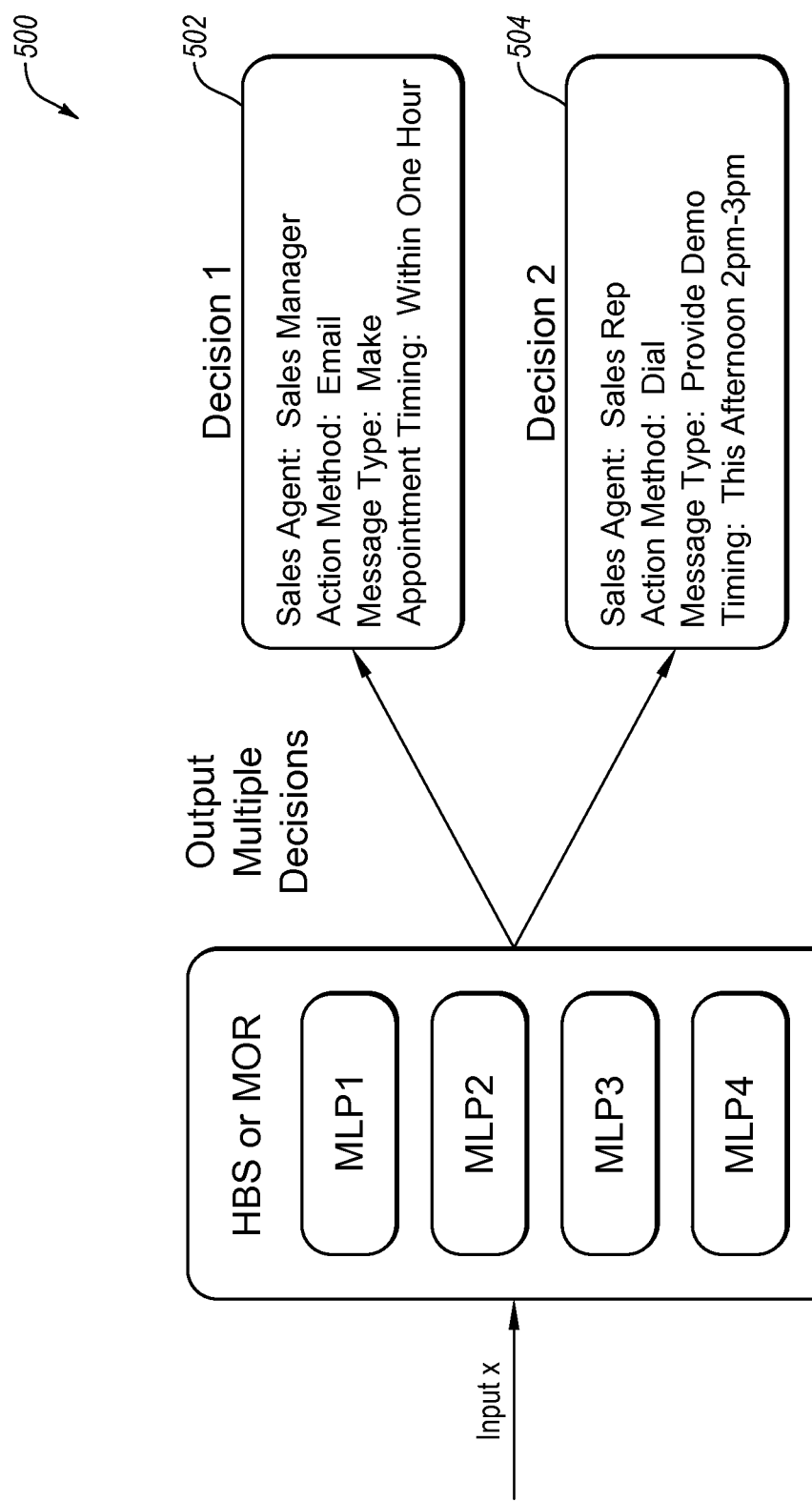
FIG. 7 is a schematic flow chart diagram of multiple correct MOD output decisions.

FIG. 7 is a schematic flow chart diagram 500 of multiple correct MOD output decisions. As disclosed in the diagram 500, and HBS machine learning model or an MOR machine learning model, or a combination of the two, may generate multiple correct output decisions 502 and 504 for a given input feature vector x. Although in a typical decision making process it is usually assumed that there is a unique correct decision given a fixed input, for LRM MOD decisions there may be multiple correct decisions which may all produce similar favorable results. A decision may be chosen among multiple correct decisions based on available resources. For example, if a particular response agent with response agent title $z_1$="sales manager" is not available at a particular time, then another correct decision with response agent title $z_1$="sales representative" may be made. Where multiple output decisions are simultaneously considered to be correct, the term "correct" may refer to multiple output decisions each having a substantially similar output value. For example, each of the output decisions 502 and 504 of FIG. 7 may have an identical or substantially similar output value, which indicates that performing either output decision would produce similar favorable results. Additionally or alternatively, the term "correct" may refer to multiple output decisions each having an output value above a predetermined threshold. The threshold may be predetermined to be relatively high or relatively low, depending on the application. Although only two correct output decisions are disclosed in FIG. 5, it is understood that the HBS machine learning model or the MOR machine learning model, or a combination of the two, may generate more than two correct output decisions.

Having described example methods of employing an IWL machine learning model to predict multiple interdependent output components of an MOD output decision with respect to FIGS. 3-7, example systems and user interfaces that enable agents to access and implement the resulting output decisions will be described with respect to FIGS. 8-10B. It is understood that these specific systems and user interfaces are only some of countless systems and user interfaces in which example embodiments may be employed. The scope of the example embodiments is not intended to be limited to any particular system or user interface.

Figure 8:
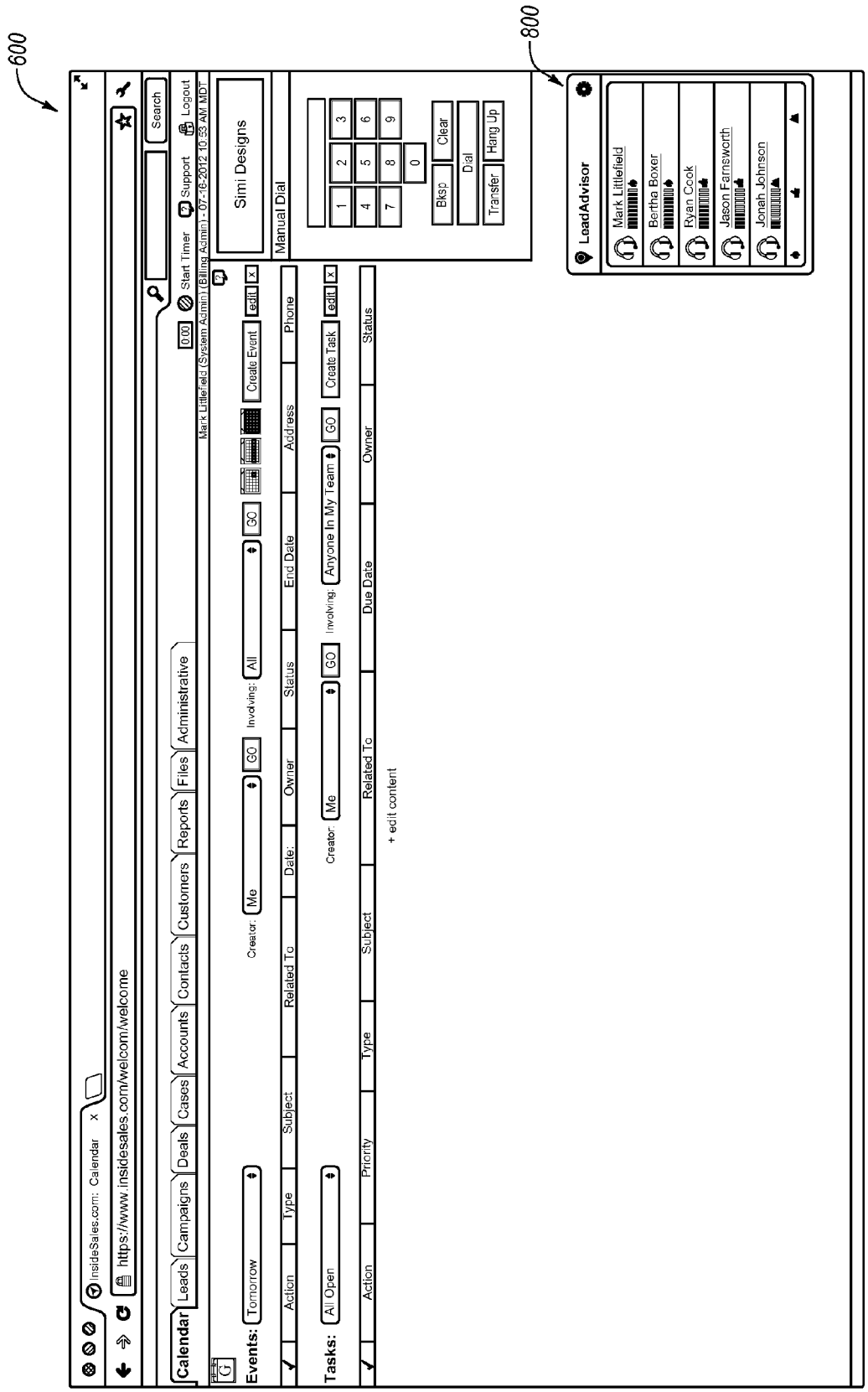
FIG. 8 illustrates an example computer screen image of a user interface of an example customer relationship management (CRM) system.

FIG. 8 illustrates an example computer screen image of a user interface 600 of an example customer relationship management (CRM) system. The user interface 600 includes various controls that allow an agent to manage customer relationships and, in particular, manage leads that are provided by the CRM system. The user interface 600 may be presented to an agent by the web server 170 on the workstations 128 or on the local agent workstations 192 of FIG. 1, for example. The agent may use the user interface 600 to respond to leads that have been previously stored on the lead data server 190 of FIG. 1. In particular, the lead advisor display 800 may allow the agent to respond to leads in a manner that optimizes contact or qualification rates, as discussed below in connection with FIGS. 10A and 10B.

Figure 9:
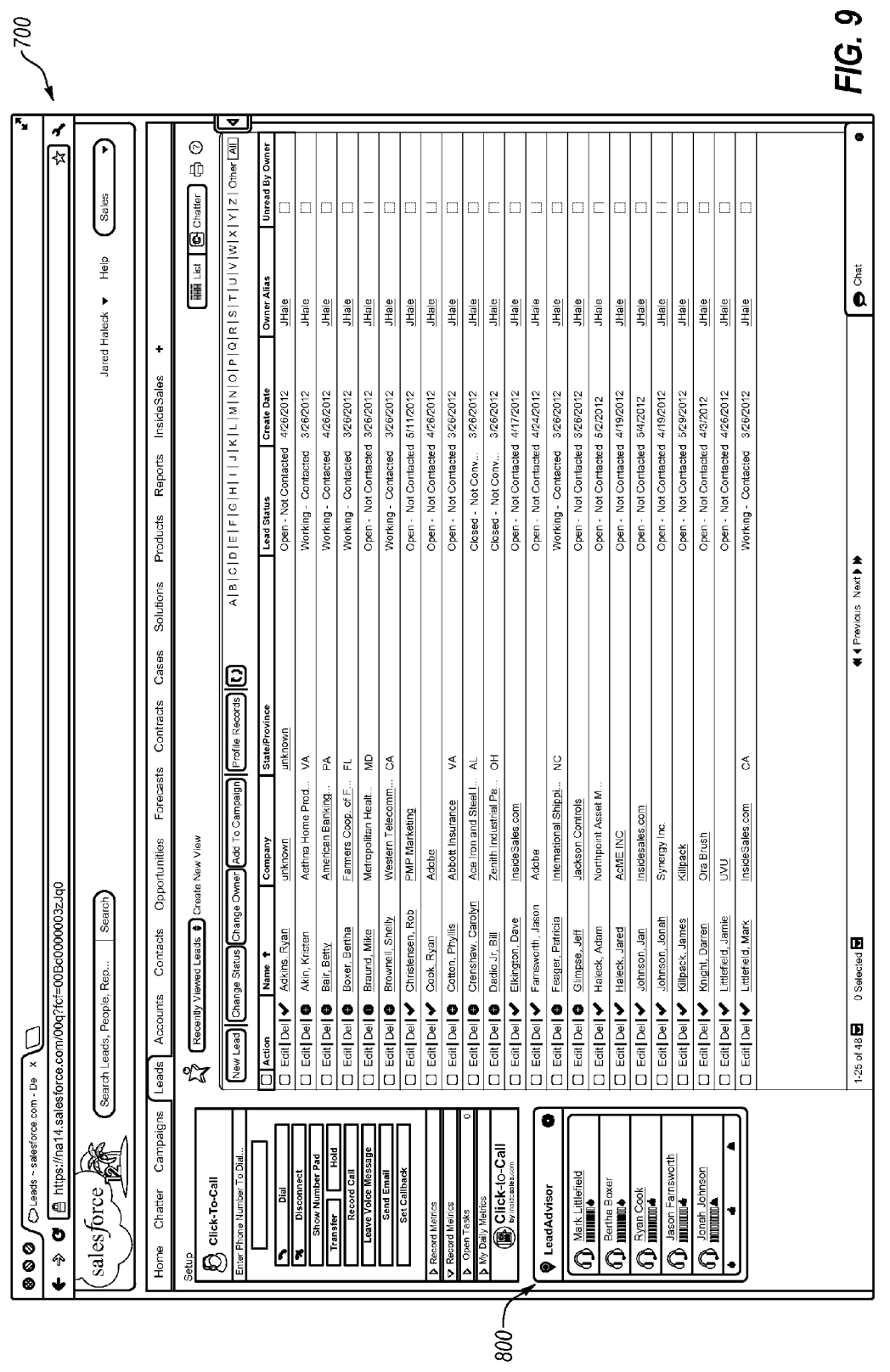

FIG. 9 illustrates an example computer screen image of a user interface 700 of an example LRM system, such as the LRM system of FIG. 1. Like the user interface 600 of FIG. 8, the user interface 700 includes various controls that allow an agent to respond to lead. The user interface 700 may be presented to an agent in a similar manner as the user interface 600. The user interface also includes a lead advisor display 800.

Figure 10A:
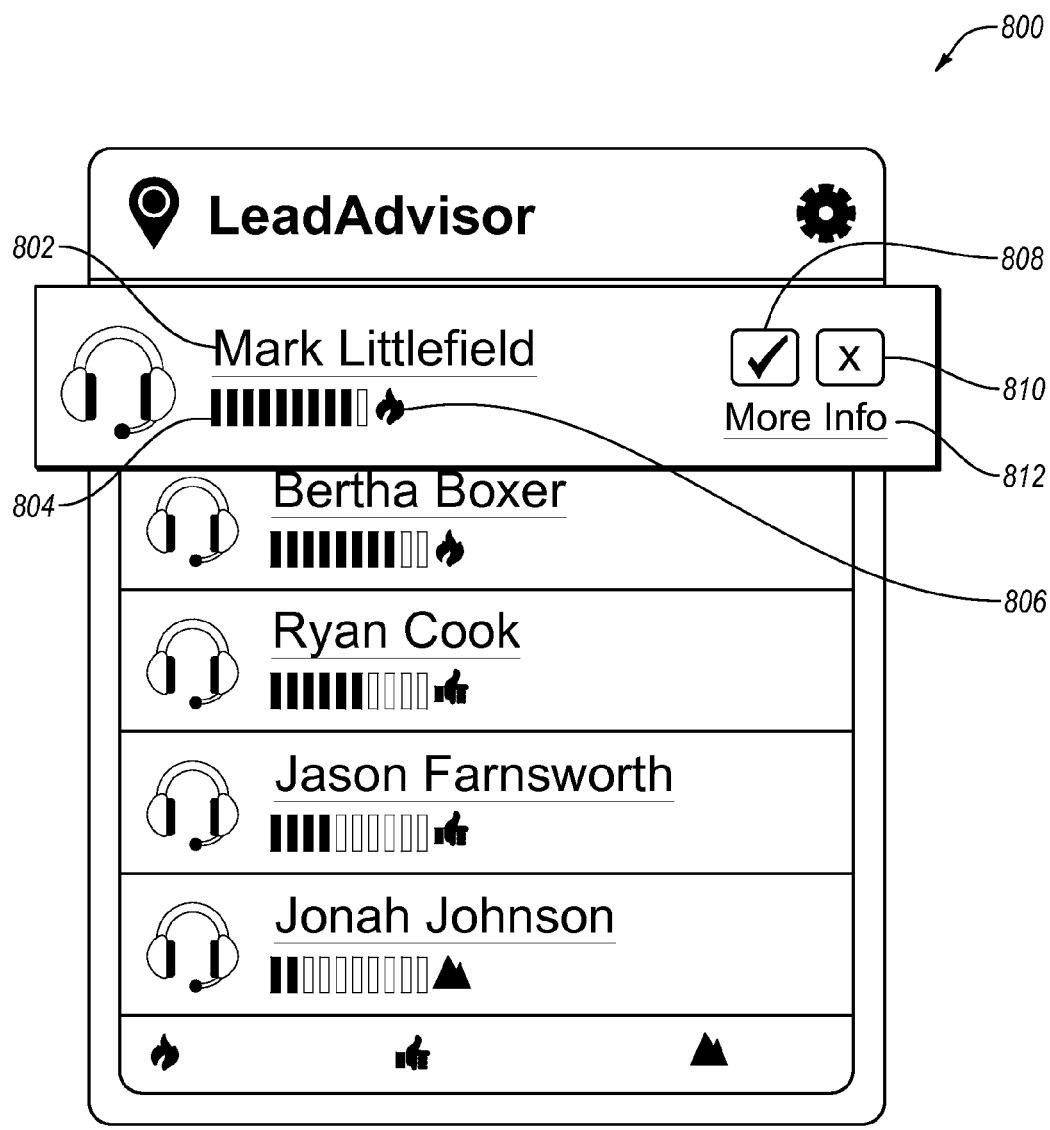
FIG. 10A illustrates an example computer screen image of an example lead advisor display before a lead has been selected by an agent.
Figure 10B:
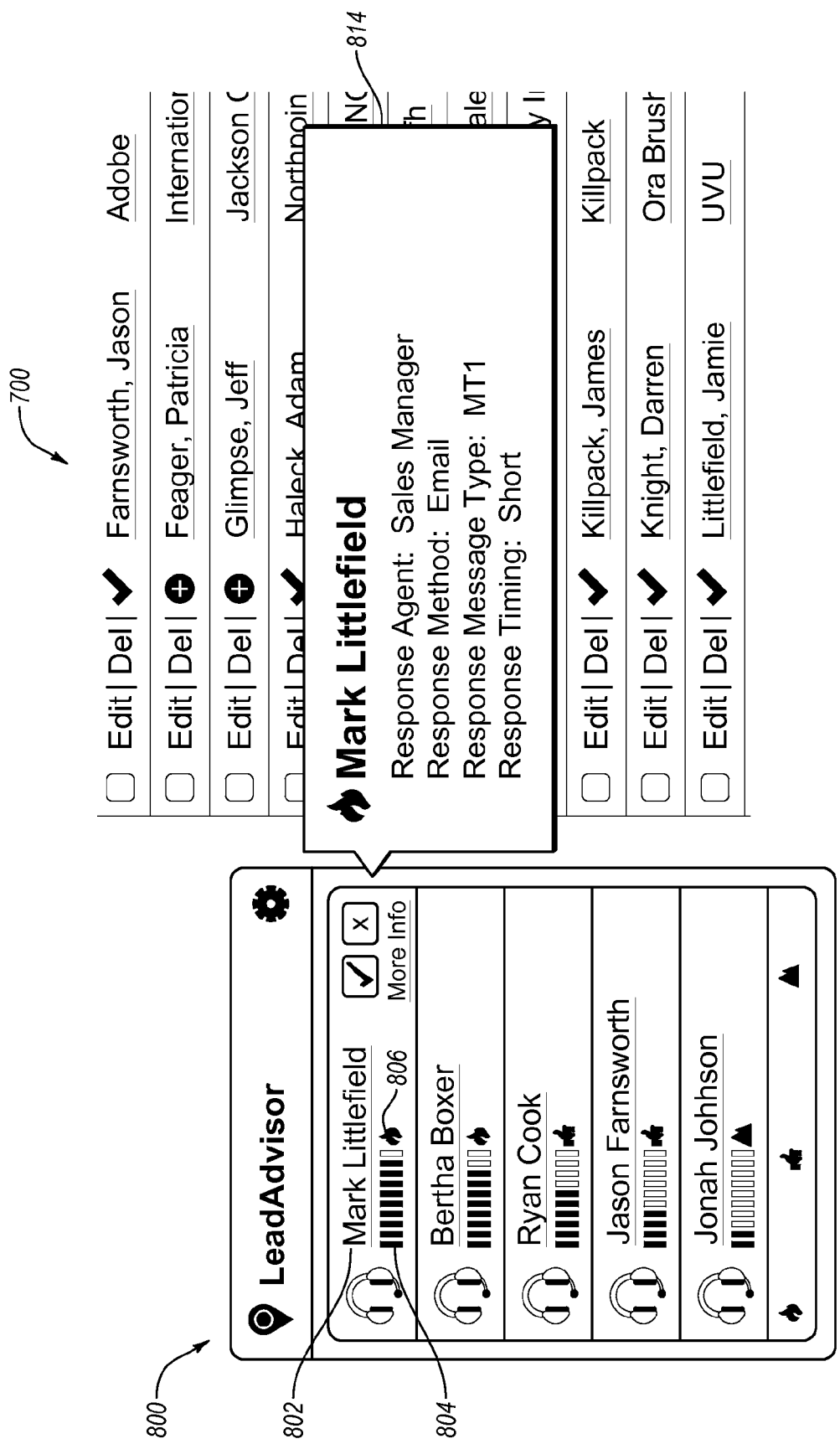
FIG. 10B illustrates an example computer screen image of the example lead advisor display of FIG. 10A after a lead has been selected by an agent.

FIG. 10A illustrates an example computer screen image of the example lead advisor display 800 before a lead has been selected by an agent and FIG. 10B illustrates an example computer screen image of the example lead advisor display 800 after a lead has been selected by an agent. As disclosed in FIG. 10A, the lead advisor display 800 lists five leads. Each lead includes a name 802, a likelihood of success meter 804, and a likelihood of success category indicator 806. As disclosed in FIG. 10A, the leads are listed by highest likelihood of success to lowest likelihood of success. Upon inquiry by the agent, by mousing-over a lead with a mouse pointer for example, the lead may expand as shown in FIG. 10A for lead "Mark Littlefield." Upon expansion, the lead may present the agent with additional options, such as a confirm button 808, a delete button 810, and a "more info" link 812.

Upon selection of the "more info" link 812 by the agent, by clicking on the more info link 812 with a mouse pointer for example, the agent may be presented with a pop-out display 814 as disclosed in FIG. 10B. The pop-out display 814 may present the agent with an LRM plan associated with the lead. This LRM plan may have been generated by the example methods disclosed herein and may reflect the output decision with the highest, or among the highest, output value for the lead. As disclosed in FIG. 10B, the LRM plan for the lead named "Mark Littlefield" may include employing a sales manager to send an email with message type MT1 in a short timeframe, which corresponds to the output decision 502 of FIG. 7. The agent may then simply click on the pop-out display 814 to have the lead advisor display 800 automatically generate an email to the lead with message type MT1 that will be sent by a sales manager immediately. Alternatively, the agent may manually override the response plan and manually perform a different response.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" may refer to software objects or routines that execute on the computing system. The different modules described herein may be implemented as objects or processes that execute on the computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically recited examples and conditions.

The invention claimed is:

1. A method of employing an instance weighted learning (IWL) machine learning model to train a classifier, the method comprising:

determining a quality value for each machine learning training instance in a temporal sequence of reinforcement learning machine learning training instances, each quality value being determined by determining a reward of a current machine learning training instance in the temporal sequence and determining a discounted portion of the reward that is added to each of the previous machine learning training instances in the temporal sequence, each of the machine learning training instances including a state-action pair;

associating the corresponding determined quality value with each of the machine learning training instances; and training, using reinforcement learning, a classifier using each of the machine learning training instances, with each of the machine learning training instances weighted during the training based on its associated quality value using a weighting factor that is a function of its associated quality value, such that the training of the classifier is influenced more by a machine learning training instance with a higher quality value than by a machine learning training instance with a lower quality value.

2. The method as recited in claim 1, wherein the classifier comprises a multilayer perceptron (MLP) neural network, another multilayer neural network, a decision tree, or a support vector machine.

3. The method as recited in claim 1, wherein each of the quality values can be positive or negative, with a positive quality value tending to encourage learning to support instances similar to the associated machine learning training instance and a negative quality value tending to discourage learning to support instances similar to the corresponding machine learning training instance.

4. The method as recited in claim 1, wherein each of the machine learning training instances is weighted during the training based on its associated quality value using a weighting factor that is a function of its associated quality value according to the following formula:

$$u(q)=(a+b\cdot q), \text{where:}$$

q is the associated quality value;
u(q) is the weighting factor;
a is a first empirical parameter; and
b is a second empirical parameter.

5. The method as recited in claim 1, wherein the discounted portion of the reward that is associated with each of the previous machine learning training instances is reduced the farther that each previous machine learning training instance is positioned in the temporal sequence from the current machine learning training instance.

6. The method as recited in claim 1, wherein:

each of the machine learning training instances is a multiple output dependency (MOD) machine learning training instance, with each of the MOD machine learning training instances including multiple interdependent output components; and training, using the reinforcement learning, the classifier using each of the MOD machine learning training instances includes employing a hierarchical based sequencing (HBS) machine learning model or a multiple output relaxation (MOR) machine learning model in the training.

7. The method as recited in claim 6, wherein each of the MOD machine learning training instance is a lead response management (LRM) MOD machine learning training instance.

8. A non-transitory computer-readable medium storing a program configured to cause a processor to execute the method as recited in claim 1.

\* \* \* \* \*